United States Patent
Nara et al.

(10) Patent No.: US 12,098,346 B2
(45) Date of Patent: *Sep. 24, 2024

(54) REFRIGERATING MACHINE OIL, WORKING FLUID COMPOSITION FOR REFRIGERATING MACHINE, AND METHOD FOR PRODUCING REFRIGERATING MACHINE OIL

(71) Applicant: ENEOS CORPORATION, Tokyo (JP)

(72) Inventors: Fumiyuki Nara, Tokyo (JP); Yohei Shono, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/920,114

(22) PCT Filed: Apr. 27, 2021

(86) PCT No.: PCT/JP2021/016816
§ 371 (c)(1),
(2) Date: Oct. 20, 2022

(87) PCT Pub. No.: WO2021/221060
PCT Pub. Date: Nov. 4, 2021

(65) Prior Publication Data
US 2023/0134730 A1    May 4, 2023

(30) Foreign Application Priority Data
Apr. 30, 2020  (JP) ................. 2020-080371

(51) Int. Cl.
| | | |
|---|---|---|
| *C10M 169/04* | (2006.01) | |
| *C09K 5/04* | (2006.01) | |
| *C10M 101/02* | (2006.01) | |
| *C10M 107/04* | (2006.01) | |
| *C10M 111/04* | (2006.01) | |
| *C10M 137/10* | (2006.01) | |
| *C10M 145/16* | (2006.01) | |
| *C10M 161/00* | (2006.01) | |
| *C10N 20/02* | (2006.01) | |
| *C10N 30/02* | (2006.01) | |
| *C10N 40/30* | (2006.01) | |

(52) U.S. Cl.
CPC ......... *C10M 169/044* (2013.01); *C09K 5/042* (2013.01); *C10M 101/02* (2013.01); *C10M 107/04* (2013.01); *C10M 111/04* (2013.01); *C10M 137/105* (2013.01); *C10M 145/16* (2013.01); *C10M 161/00* (2013.01); *C10M 2203/1006* (2013.01); *C10M 2205/0225* (2013.01); *C10M 2209/086* (2013.01); *C10M 2223/041* (2013.01); *C10M 2223/047* (2013.01); *C10N 2020/02* (2013.01); *C10N 2030/02* (2013.01); *C10N 2040/30* (2013.01)

(58) Field of Classification Search
CPC . C09K 5/042; C10M 145/16; C10M 169/044; C10M 137/105; C10M 101/02; C10M 107/04; C10M 171/02; C10M 111/04; C10M 171/008; C10M 161/00; C10M 2203/1006; C10M 2223/047; C10M 2223/041; C10M 2205/0225; C10M 2203/1025; C10M 2209/086; C10M 2205/022; C10N 2030/02; C10N 2020/02; C10N 2030/06; C10N 2040/30; C10N 2020/103
See application file for complete search history.

(56) References Cited

U.S. PATENT DOCUMENTS

| | | | |
|---|---|---|---|
| 7,914,697 B2 | 3/2011 | Kaneko | |
| 8,715,522 B2 * | 5/2014 | Tokiai | C10M 145/36 252/68 |
| 2014/0121144 A1 * | 5/2014 | Fujinami | C10M 115/08 508/481 |
| 2015/0014574 A1 | 1/2015 | Saito et al. | |

FOREIGN PATENT DOCUMENTS

| | | |
|---|---|---|
| CN | 101400769 A | 4/2009 |
| CN | 104145008 A | 11/2014 |
| CN | 109415652 A | 3/2019 |
| EP | 0 586 705 A1 | 3/1994 |
| EP | 0 992 570 A2 | 4/2000 |
| EP | 1 394 289 A1 | 3/2004 |
| EP | 1 995 299 A1 | 11/2008 |
| EP | 2 821 466 A1 | 1/2015 |
| EP | 3 521 407 A1 | 8/2019 |
| JP | H6-116579 A | 4/1994 |
| JP | 2018-083920 A | 5/2018 |
| WO | 2007/105452 A1 | 9/2007 |
| WO | 2013/128748 A1 | 9/2013 |
| WO | 2013/129579 A1 | 9/2013 |
| WO | 2014/047017 A1 | 3/2014 |
| WO | 2019/111688 A1 | 6/2019 |
| WO | 2019/111689 A1 | 6/2019 |

OTHER PUBLICATIONS

ISR issued in International Patent Application No. PCT/JP2021/016816, Aug. 3, 2021, translation.
IPRP issued in International Patent Application No. PCT/JP2021/016816, Nov. 10, 2022, translation.
European Search Report issued in EP Patent Application No. 21796063.2, Aug. 16, 2023.

* cited by examiner

*Primary Examiner* — Vishal V Vasisth
(74) *Attorney, Agent, or Firm* — GREENBLUM & BERNSTEIN, P.L.C.

(57) ABSTRACT

An aspect of the present invention provides a refrigerating machine oil containing a mixed base oil of a first hydrocarbon base oil having a kinematic viscosity at 40° C. of less than 6 mm²/s and a second hydrocarbon base oil having a kinematic viscosity at 40° C. of 6 mm²/s or more, wherein a (A)/(B) ratio is more than 1 and 1.5 or less, wherein (A) is a kinematic viscosity at 40° C. of the mixed base oil, and (B) is the kinematic viscosity at 40° C. of the first hydrocarbon base oil.

9 Claims, No Drawings though the above-described conventional refrigerating machine oil is expected to be effective to some extent in reducing friction in a boundary lubrication region having a high friction coefficient, but is not necessarily sufficient in improving efficiency of a compressor. In particular, in a lubrication region (an elastic fluid lubrication region or a mixed lubrication region) having a relatively high sliding speed in which the friction coefficient rapidly starts to increase as the sliding speed decreases, which is focused on by the present inventors, there is a problem in that the friction coefficient rather increases.

The present invention has been made in view of the above-described circumstances, and an object thereof is to provide a refrigerating machine oil having excellent low friction characteristics even in a lubrication region where a sliding speed is relatively high as described above.

REFRIGERATING MACHINE OIL, WORKING FLUID COMPOSITION FOR REFRIGERATING MACHINE, AND METHOD FOR PRODUCING REFRIGERATING MACHINE OIL

This application is a 371 of PCT/JP2021/016816, filed Apr. 27, 2021.

TECHNICAL FIELD

The present invention relates to a refrigerating machine oil, a working fluid composition for a refrigerating machine, and a method for producing a refrigerating machine oil.

BACKGROUND ART

A refrigerating machine such as a refrigerator contains a refrigerant circulation system containing a compressor, a condenser, an expansion mechanism (an expansion valve, a capillary), an evaporator, and the like, and heat exchange is performed by circulating a refrigerant in the refrigerant circulation system.

Compressors for refrigerating machines contains rotary compressors, piston-crank compressors, and the like. For example, in a piston-crank type compressor, a rotary motion of a motor is converted into a reciprocating motion by a connecting rod, and a piston coupled to the connecting rod is reciprocated to compress a refrigerant. The refrigerating machine oil is sealed in a compressor together with a refrigerant, and lubricates sliding members such as a connecting rod and a piston. As such a refrigerating machine oil, for example, the following Patent Document 1 discloses a refrigerating machine oil containing a mineral oil having a relatively low viscosity and a specific copolymer.

CITATION LIST

Patent Document

[Patent Document 1] Japanese Unexamined Patent Application Publication No. 2018-83920

SUMMARY OF INVENTION

Technical Problem

When the viscosity at 100° C. of the conventional refrigerating machine oil is lowered, it is effective to some extent for lowering the friction in the fluid lubrication region, but in a low sliding speed region such as an elastic fluid lubrication region, a mixed lubrication region, or a boundary lubrication region, the opportunity of metal-to-metal contact increases, and the friction coefficient tends to increase. In addition, for example, the above-described conventional refrigerating machine oil is expected to be effective to some extent in reducing friction in a boundary lubrication region having a high friction coefficient, but is not necessarily sufficient in improving efficiency of a compressor. In particular, in a lubrication region (an elastic fluid lubrication region or a mixed lubrication region) having a relatively high sliding speed in which the friction coefficient rapidly starts to increase as the sliding speed decreases, which is focused on by the present inventors, there is a problem in that the friction coefficient rather increases.

The present invention has been made in view of the above-described circumstances, and an object thereof is to provide a refrigerating machine oil having excellent low friction characteristics even in a lubrication region where a sliding speed is relatively high as described above.

Solution to Problem

An aspect of the present invention provides a refrigerating machine oil containing a mixed base oil of a first hydrocarbon base oil having a kinematic viscosity at 40° C. of less than 6 mm$^2$/s and a second hydrocarbon base oil having a kinematic viscosity at 40° C. of 6 mm$^2$/s or more, wherein a (A)/(B) ratio is more than 1 and 1.5 or less, wherein (A) is a kinematic viscosity at 40° C. of the mixed base oil, and (B) is the kinematic viscosity at 40° C. of the first hydrocarbon base oil.

The kinematic viscosity at 40° C. of the second hydrocarbon base oil may be 20 mm$^2$/s or more and 1000 mm$^2$/s or less.

A content of the second hydrocarbon base oil in the mixed base oil may be 0.5% by mass or more and 10% by mass or less.

The refrigerating machine oil may contain a phosphorus-containing additive.

The refrigerating machine oil may contain a polymer additive. A content of the polymer additive may be 5% by mass or less based on a total amount of the refrigerating machine oil.

The refrigerating machine oil may have a kinematic viscosity at 40° C. of 6 mm$^2$/s or less.

The refrigerating machine oil may be used together with a hydrocarbon refrigerant.

Another aspect of the present invention provides a working fluid composition for a refrigerating machine oil containing: the above refrigerating machine oil; and a refrigerant. The refrigerant may contain a hydrocarbon refrigerant.

Another aspect of the present invention provides a method for producing a refrigerating machine oil containing a mixed base oil of a first hydrocarbon base oil having a kinematic viscosity at 40° C. of less than 6 mm$^2$/s and a second hydrocarbon base oil having a kinematic viscosity at 40° C. of 6 mm$^2$/s or more, the method containing: mixing the first hydrocarbon base oil and the second hydrocarbon base oil such that a (A)/(B) ratio is more than 1 and 1.5 or less, wherein (A) is a kinematic viscosity at 40° C. of the mixed base oil, and (B) is the kinematic viscosity at 40° C. of the first hydrocarbon base oil.

Advantageous Effects of Invention

According to the present invention, it is possible to provide a refrigerating machine oil having excellent low friction characteristics even in a lubrication region in which a sliding speed is relatively high.

DESCRIPTION OF EMBODIMENTS

Hereinafter, embodiments of the present invention will be described in detail.

The refrigerating machine oil according to the present embodiment contains a mixed base oil of a first hydrocarbon base oil having a kinematic viscosity at 40° C. of less than 6 mm$^2$/s and a second hydrocarbon base oil having a kinematic viscosity at 40° C. of 6 mm$^2$/s or more.

As the first hydrocarbon base oil, for example, a mineral hydrocarbon oil, a synthetic hydrocarbon oil, or a mixture thereof can be used. Examples of the mineral oil-based hydrocarbon oil include paraffinic mineral oils and naphthenic mineral oils obtained by refining a lubricating oil fraction obtained by atmospheric distillation or vacuum distillation of a paraffinic or naphthenic crude oil by a method such as solvent deasphalting, solvent refining, hydrorefining, hydrocracking, solvent dewaxing, hydrodewaxing, clay treatment, or sulfuric acid washing. These purification methods may be used alone or in combination of two or more thereof. Examples of the synthetic hydrocarbon oil include alkylbenzenes, alkylnaphthalenes, poly α-olefins (PAO), polybutenes, and ethylene-α-olefin copolymers.

The kinematic viscosity at 40° C. of the first hydrocarbon base oil is less than 6 mm$^2$/s, preferably 4 mm$^2$/s or less, and more preferably 4 mm$^2$/s or less. The lower limit of the kinematic viscosity at 40° C. of the first hydrocarbon base oil is not particularly limited, and is, for example, more than 0 mm$^2$/s, preferably 0.5 mm$^2$/s or more, more preferably 1 mm$^2$/s or more, and even more preferably 1.5 mm$^2$/s or more. The kinematic viscosity in the present specification means kinematic viscosity measured in accordance with JIS K2283:2000.

As the second hydrocarbon base oil, for example, a mineral hydrocarbon oil, a synthetic hydrocarbon oil, or a mixture thereof can be used. Examples of the mineral oil-based hydrocarbon oil include paraffinic mineral oils and naphthenic mineral oils obtained by refining a lubricating oil fraction obtained by atmospheric distillation or vacuum distillation of a paraffinic or naphthenic crude oil by a method such as solvent deasphalting, solvent refining, hydrorefining, hydrocracking, solvent dewaxing, hydrodewaxing, clay treatment, or sulfuric acid washing. These purification methods may be used alone or in combination of two or more thereof. Examples of the synthetic hydrocarbon oil include alkylbenzenes, alkylnaphthalenes, poly α-olefins (PAO), polybutenes, and ethylene-α-olefin copolymers.

The kinematic viscosity at 40° C. of the second hydrocarbon base oil is 6 mm$^2$/s or more, preferably 8 mm$^2$/s or more, more preferably 10 mm$^2$/s or more, even more preferably 20 mm$^2$/s or more, particularly preferably 50 mm$^2$/s or more, and extremely preferably 90 mm$^2$/s or more, from the viewpoint of more effectively reducing the friction coefficient. The upper limit of the kinematic viscosity at 40° C. of the second hydrocarbon base oil is not particularly limited, and is, for example, 1000 mm$^2$/s or less, or preferably 500 mm$^2$/s or less.

A (A)/(B) ratio is more than 1 and 1.5 or less wherein the kinematic viscosity at 40° C. of the mixed base oil is (A) and the kinematic viscosity at 40° C. of the first hydrocarbon base oil is (B). From the viewpoint of more effectively reducing the friction coefficient, the (A)/(B) ratio is preferably 1.4 or less, more preferably 1.35 or less, still more preferably 1.3 or less, and particularly preferably 1.25 or less. The lower limit of (A)/(B) ratio is not particularly limited, but is usually more than 1, and may be, for example, 1.1 or more, from the viewpoint of more effectively reducing the friction coefficient. When a plurality of base oil components corresponding to the first hydrocarbon base oil or the second hydrocarbon base oil are contained, the above (A) means the kinematic viscosity at 100° C. of the mixed base oil containing all the base oil components corresponding to the first hydrocarbon base oil or the second hydrocarbon base oil. In addition, when a plurality of base oil components corresponding to the first hydrocarbon base oil are contained, (B) means the kinematic viscosity at 40° C. of the mixed base oil containing all of the base oil components corresponding to the first hydrocarbon base oil.

The content of the first hydrocarbon base oil may be 50% by mass or more, 60% by mass or more, 70% by mass or more, 80% by mass or more, 90% by mass or more, or 95% by mass or more, based on the total amount of the first hydrocarbon base oil and the second hydrocarbon base oil (that is, the total amount of the mixed base oil; the same applies hereinafter). The upper limit of the content of the first hydrocarbon base oil is not particularly limited, and may be, for example, less than 100% by mass, 99.9% by mass or less, 99.5% by mass or less, or 99% by mass or less, based on the total amount of the first hydrocarbon base oil and the second hydrocarbon base oil.

The content of the first hydrocarbon base oil may be 50% by mass or more, 60% by mass or more, 70% by mass or more, 80% by mass or more, or 85% by mass or more, based on the total amount of the refrigerating machine oil. The upper limit of the content of the first hydrocarbon base oil is not particularly limited, and may be, for example, 98% by mass or less, 95% by mass or less, or 90% by mass or less, based on the total amount of the refrigerating machine oil.

The content of the second hydrocarbon base oil may be 0.1% by mass or more, 0.5% by mass or more, or 1% by mass or more, based on the total amount of the first hydrocarbon base oil and the second hydrocarbon base oil. The upper limit of the content of the second hydrocarbon base oil may be, for example, 50% by mass or less, 40% by mass or less, 30% by mass or less, 20% by mass or less, 10% by mass or less, or 5% by mass or less, based on the total amount of the first hydrocarbon base oil and the second hydrocarbon base oil.

The content of the second hydrocarbon base oil may be 0.1% by mass or more, 0.5% by mass or more, 1% by mass or more, or 3% by mass or more, based on the total amount of the refrigerating machine oil. The upper limit of the content of the second hydrocarbon base oil is not particularly limited, and may be, for example, 50% by mass or less, 40% by mass or less, 30% by mass or less, 20% by mass or less, 10% by mass or less, or 5% by mass or less, based on the total amount of the refrigerating machine oil.

The refrigerating machine oil may further contain a base oil other than the mixed base oil as a lubricating base oil. The total content of the first and the second hydrocarbon base oils (i.e., the mixed base oil) may be, for example, 50% by mass or more, 60% by mass or more, 70% by mass or more, 80% by mass or more, 90% by mass or more, or 100% by mass, based on the total amount of the lubricating base oil.

The total content of the first hydrocarbon base oil and the second hydrocarbon base oil (i.e., the mixed base oil) may be 50% by mass or more, 60% by mass or more, 70% by mass or more, 80% by mass or more, or 90% by mass or more, based on the total amount of the refrigerating machine oil.

The base oil other than the first hydrocarbon base oil and the second hydrocarbon base oil is not particularly limited, and examples thereof include oxygen-containing oils such as esters, ethers, carbonates, ketones, silicones, and polysiloxanes. Examples of the ester include a monoester, a polyol ester, an aromatic ester, a dibasic acid ester, a complex ester, a thereof. Examples of the ether include polyvinyl ether (PVE), polyalkylene glycol (PAG), polyphenyl ether, perfluoroether, and mixtures thereof. Among these, it is preferable to use a monoester of a monohydric aliphatic alcohol and a monocarboxylic fatty acid, and it is desirable to use a mixture of the monoester and a polyol ester of a di- to hexa-hydric alcohol and a monocarboxylic fatty acid as necessary.

Examples of the monohydric aliphatic alcohol constituting such an ester include monohydric aliphatic alcohols having 1 to 20 carbon atoms, preferably 4 to 18 carbon atoms, and more preferably 4 to 12 carbon atoms. Examples of the monocarboxylic fatty acid constituting such an ester include monocarboxylic fatty acids having 1 to 20 carbon atoms, preferably 4 to 18 carbon atoms, and more preferably 4 to 12 carbon atoms. Preferred examples of the di- to hexa-hydric alcohol constituting such an ester include neopentyl glycol, trimethylolpropane, pentaerythritol, and dipentaerythritol.

From the viewpoint of more effectively reducing the friction coefficient, the kinematic viscosity at 40° C. of the mixed base oil or the lubricating base oil is preferably 20 mm$^2$/s or less, more preferably 10 mm$^2$/s or less, even more preferably 6 mm$^2$/s or less, particularly preferably 4 mm$^2$/s or less, and extremely preferably 3.5 mm$^2$/s or less. The kinematic viscosity at 40° C. of the mixed base oil or the lubricating base oil is not particularly limited, and may be, for example, 0.5 mm$^2$/s or more, preferably 1 mm$^2$/s or more, and more preferably 1.5 mm$^2$/s or more.

The kinematic viscosity at 100° C. of the mixed base oil or the lubricating base oil may be preferably 0.5 mm$^2$/s or more, more preferably 0.8 mm$^2$/s or more, still more preferably 1 mm$^2$/s or more. The kinematic viscosity at 100° C. of the mixed base oil or the lubricating base oil may be preferably 10 mm$^2$/s or less, more preferably 5 mm$^2$/s or less, still more preferably 3 mm$^2$/s or less, particularly preferably 2 mm$^2$/s or less, and extremely preferably 1.5 mm$^2$/s or less.

The content of the lubricating base oil may be 50% by mass or more, 60% by mass or more, 70% by mass or more, 80% by mass or more, or 90% by mass or more, and may be 99.9% by mass or less, 99.5% by mass or less, or 99% by mass or less, based on the total amount of the refrigerating machine oil.

The refrigerating machine oil according to the present embodiment may further contain a phosphorus-containing additive in addition to the lubricating base oil. Examples of the phosphorus-containing additive contained in the refrigerating machine oil according to the present embodiment include a phosphorus-based extreme pressure agent. Examples of the phosphorus-based extreme pressure agent include a phosphoric acid ester, an acidic phosphoric acid ester, an amine salt of acidic phosphoric acid ester, a chlorinated phosphoric acid ester, a phosphorous acid ester, and a thiophosphoric acid. These phosphorus-containing additives may be used alone or in combination of two or more thereof. The phosphorus-containing additive is preferably at least one selected from the group consisting of a phosphoric acid ester and a thiophosphoric acid, and more preferably at least one selected from the group consisting of triphenyl phosphate (TPP), tricresyl phosphate (TCP), and triphenyl phosphorothionate (TPPT).

From the viewpoint of more effectively reducing the friction coefficient, the content of the phosphorus-containing additive is preferably 0.01% by mass or more, more preferably 0.1% by mass or more, even more preferably 1% by mass or more, and particularly preferably 1.2% by mass, and is preferably 5% by mass or less, more preferably 3% by mass or less, and even more preferably 2% by mass or less, based on the total amount of the refrigerating machine oil.

The refrigerating machine oil according to the present embodiment may further contain a polymer additive in addition to the lubricating base oil. As described above, the lubricating base oil may contain a base oil component such as a PAO, PAG, or PVE, but the polymer additive according to the present embodiment contains a polymer different from these base oil components. The polymer additive is preferably a polymer containing an unsaturated carboxylic acid ester (an ester of a carboxylic acid having a polymerizable unsaturated bond and an alcohol) as a monomer unit. The polymer additive may further contain components other than the polymer, such as a diluent oil, in addition to the polymer.

The polymer may further contain an additional monomer (a monomer copolymerizable with an unsaturated carboxylic acid ester) other than the unsaturated carboxylic acid ester. That is, the polymer may be a homopolymer of one of the unsaturated carboxylic acid ester, a copolymer of two or more of the unsaturated carboxylic acid esters, or a copolymer of one or two or more of the unsaturated carboxylic acid esters and one or two or more of the additional monomers.

The unsaturated carboxylic acid constituting the unsaturated carboxylic acid ester has at least one polymerizable unsaturated bond (polymerizable carbon-carbon double bond) and at least one carboxyl group, and may be, for example, an unsaturated monocarboxylic acid having one polymerizable unsaturated bond and one carboxyl group, or an unsaturated dicarboxylic acid having one polymerizable unsaturated bond and two carboxyl groups. Examples of the unsaturated monocarboxylic acid include (meth)acrylic acid and crotonic acid. Examples of the unsaturated dicarboxylic acid include maleic acid, fumaric acid, citraconic acid, mesaconic acid, and itaconic acid.

The alcohol constituting the unsaturated carboxylic acid ester may be, for example, an alcohol having 1 to 40 carbon atoms, preferably contains an alcohol having 1 to 18 carbon atoms, and more preferably contains an alcohol having 1 to 8 carbon atoms. These alcohols may be linear or branched. The alcohol may contain an alcohol having 1 to 18 carbon atoms and an alcohol having 20 to 40 carbon atoms. These alcohols may be aliphatic alcohols.

The alcohol may be a monohydric alcohol or a polyhydric alcohol. Examples of such alcohols include methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, and octadecanol (these may be linear or branched).

The monomer other than the unsaturated carboxylic acid ester (a monomer copolymerizable with the unsaturated carboxylic acid ester) is not particularly limited, and examples thereof include unsaturated carboxylic acids or anhydrides thereof exemplified as the unsaturated carboxylic acid constituting the unsaturated carboxylic acid ester described above, unsaturated hydrocarbon compounds having a polymerizable unsaturated bond, and the like. The unsaturated hydrocarbon may be, for example, an unsaturated hydrocarbon compound having 2 to 20 carbon atoms, and may be preferably an α-olefin having 2 to 20 carbon atoms or styrene. Specific examples of the α-olefin include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene.

Examples of the (co)polymer of the unsaturated carboxylic acid ester include, more specifically, a (co)polymer of a (meth)acrylic acid ester, and a copolymer of an unsaturated carboxylic acid ester and an α-olefin, and a copolymer of an unsaturated carboxylic acid ester and an α-olefin is particularly preferable. The copolymer of the unsaturated carboxylic acid ester is preferably a copolymer of the (meth)acrylic acid esters. The copolymer of the unsaturated carboxylic acid ester and the α-olefin is preferably at least one selected from the group consisting of a copolymer of the (meth)

acrylic acid ester and the α-olefin, and a copolymer of the unsaturated dicarboxylic acid ester and the α-olefin, and more preferably a copolymer of the unsaturated dicarboxylic acid ester and the α-olefin.

Preferred examples of the unsaturated dicarboxylic acid ester in the copolymer of the unsaturated dicarboxylic acid ester and the α-olefin include monoesters or diesters of unsaturated dicarboxylic acids such as maleic acid, fumaric acid, citraconic acid, mesaconic acid, and itaconic acid with aliphatic alcohols having 3 to 10 carbon atoms such as propanol, butanol, pentanol, hexanol, heptanol, octanol, nonanol, and decanol. The unsaturated dicarboxylic acid ester is preferably a maleic acid ester. Preferred examples of the maleic acid ester include dimethyl maleate, diethyl maleate, dipropyl maleate, dibutyl maleate, dipentyl maleate, dihexyl maleate, diheptyl maleate, and dioctyl maleate.

When the polymer is a copolymer, the content of the unsaturated carboxylic acid ester may be 10% by mole or more, 30% by mole or more, or 50% by mole or more, and may be 90% by mole or less, 70% by mole or less, or 50% by mole or less, based on the total amount of monomer units constituting the copolymer.

When the polymer is a copolymer of the unsaturated carboxylic acid ester and the α-olefin, the molar ratio of unsaturated carboxylic acid ester/α-olefin is not particularly limited, but may be preferably 1/9 or more, more preferably 3/7 or more, and is preferably 9/1, more preferably 7/3 or less.

The number average molecular weight (Mn) of the polymer additive is preferably 300 or more, more preferably 1000 or more, and even more preferably 1500 or more, and is preferably 500000 or less, more preferably 50000 or less, and even more preferably 30000 or less, and may be 20000 or less, or 15000 or less.

The weight average molecular weight (Mw) of the polymer additive is preferably 400 or more, more preferably 1000 or more, even more preferably 2000 or more, and particularly preferably 3000 or more, and is preferably 10000000 or less, more preferably 100000 or less, even more preferably 50000 or less, and particularly preferably 30000 or less.

Mw/Mn of the polymer additive is preferably 1.2 or more, more preferably 1.5 or more, even more preferably 1.7 or more, and particularly preferably 2 or more, and is preferably 5 or less, more preferably 3.5 or less, and even more preferably 3 or less.

In the present specification, "weight average molecular weight (Mw)" and "number average molecular weight (Mn)" respectively mean a weight average molecular weight and a number average molecular weight in terms of polystyrene determined by gel permeation chromatography (GPC) (standard substance: polystyrene) using an APC XT column manufactured by Waters Corporation as a column and tetrahydrofuran as a mobile phase. When the polymer additive contains a component other than the polymer, the number-average molecular weight (Mn) and the weight-average molecular weight (Mw) of the polymer additive are values measured excluding the other component.

The kinematic viscosity at 100° C. of the polymer additive is preferably 10 mm$^2$/s or more, more preferably 20 mm$^2$/s or more, even more preferably 100 mm$^2$/s or more, and is preferably 10000 mm$^2$/s or less, more preferably 1000 mm$^2$/s or less, even more preferably 800 mm$^2$/s or less, and may be 500 mm$^2$/s or less.

The kinematic viscosity at 40° C. of the polymer additive is preferably 100 mm$^2$/s or more, more preferably 200 mm$^2$/s or more, and even more preferably 400 mm$^2$/s or more than 400 mm$^2$/s, and may be 500 mm$^2$/s or 1000 mm$^2$/s or more, and is preferably 100000 mm$^2$/s or less, more preferably 20000 mm$^2$/s or less, and even more preferably 15000 mm$^2$/s or less, and may be 10000 mm$^2$/s or less or 5000 mm$^2$/s or less.

The viscosity index of the polymer additive is preferably 80 or more, more preferably 140 or more, and may be 180 or more or 200 or more, and is preferably 400 or less, more preferably 300 or less, and may be 250 or less. The viscosity index in the present specification means a viscosity index measured in accordance with JIS K2283:2000.

The polymer additive preferably has a residual carbon content in a specific range when evaporated and thermally decomposed. Although the reason for this is unclear, it is presumed that the presence of a precursor (polymer additive precursor) corresponding to the residual carbon content can further reduce the friction coefficient in a specic slip speed region. The residual carbon content of the polymer additive is, for example, 0.2% by mass or more, preferably 0.5% by mass or more, more preferably 1% by mass or more, and even more preferably 1.5% by mass or more, and may be 2% by mass or more or 2.5% by mass or more, and is preferably 10% by mass or less, more preferably 5% by mass or less, and even more preferably 4% by mass or less, and may be 3.5% by mass or less. The residual carbon content in the present specification means a residual carbon content measured by a micro method in accordance with JIS K2270-2:2009.

More specific examples of the polymer additive (polymer) described above include polymer additives described in Examples described later, and other examples include the following polymer additives (polymer).

Polymer additive 1: copolymer of maleic acid ester and α-olefin (kinematic viscosity at 40° C.: 1980 mm$^2$/s, kinematic viscosity at 100° C.: 200 mm$^2$/s, viscosity index: 227, Mn of polymer: 4500, Mw/Mn: 2.2, residual carbon content: 3.1% by mass)

Polymer additive 2: a copolymer of maleic acid ester and α-olefin (kinematic viscosity at 40° C.: 4100 mm$^2$/s, kinematic viscosity at 100° C.: 260 mm$^2$/s, viscosity index: 190, Mn of polymer: 1800, Mw/Mn: 2.7, residual carbon content: 2.8% by mass)

Polymer additive 3: copolymer of maleic acid ester and α-olefin (kinematic viscosity at 40° C.: 4300 mm$^2$/s, kinematic viscosity at 100° C.: 300 mm$^2$/s, viscosity index: 225, Mn of polymer: 2000, Mw/Mn: 2.5, residual carbon content: 1.7% by mass)

Polymer additive 4: a copolymer of maleic acid ester and α-olefin (kinematic viscosity at 40° C.: 7000 mm$^2$/s, kinematic viscosity at 100° C.: 500 mm$^2$/s, viscosity index: 230, Mn of polymer: 2650, Mw/Mn: 4.0, residual carbon content: 2% by mass)

Polymer additive 5: copolymer of maleic acid ester and α-olefin (kinematic viscosity at 40° C.: 11000 mm$^2$/s, kinematic viscosity at 100° C.: 700 mm$^2$/s, viscosity index: 250, Mn of polymer: 2690, Mw/Mn: 3.1, residual carbon content: 1.5% by mass)

Polymer additive 6: copolymer of maleic acid ester and α-olefin (kinematic viscosity at 40° C.: 400 mm$^2$/s, kinematic viscosity at 100° C.: 40 mm$^2$/s, viscosity index: 160, residual carbon content: 0.8% by mass)

Polymer additive 7: copolymer of (meth)acrylic esters (kinematic viscosity at 100° C.: 600 mm$^2$/s, Mn of polymer: 25000, Mw/Mn: 1.4, residual carbon content: 1.1% by mass)

Polymer additive 8: copolymer of (meth)acrylic esters (kinematic viscosity at 100° C.: 370 mm²/s, Mn of polymer: 25900, Mw/Mn: 1.3, residual carbon content: 1.1% by mass)

Polymer additive 9: copolymer of (meth)acrylic esters (kinematic viscosity at 100° C.: 180 mm²/s, Mn of polymer: 3620, Mw/Mn: 2.0, residual carbon content: 1.3% by mass)

Polymer additive 10: copolymer of (meth)acrylic esters (kinematic viscosity at 100° C.: 360 mm²/s, Mn of polymer: 11000, Mw/Mn: 1.6, residual carbon content: 0.9% by mass)

Polymer additive 11: copolymer of (meth)acrylic esters (kinematic viscosity at 100° C.: 380 mm²/s, Mn of polymer: 22500, Mw/Mn: 1.5, residual carbon content: 0.1% by mass)

The content of the polymer additive is not particularly limited, but preferably 0.1% by mass or more, more preferably 0.5% by mass or more, and even more preferably 0.8% by mass or more, from the viewpoint of further improving the friction characteristics of the refrigerating machine oil, and may be preferably 5% by mass or less, more preferably 2% by mass or less, still more preferably less than 2% by mass, particularly preferably 1% by mass or less, and may be less than 1% by mass, from the viewpoint of suppressing the viscosity at 100° C. of the refrigerating machine oil and achieving a lower friction coefficient even in a region where the sliding speed is relatively high, based on the total amount of the refrigerating machine oil The refrigerating machine oil according to the present embodiment may further contain an additional additive in addition to the above-described components. Examples of the additive include an antioxidant, an acid scavenger, a phosphorus-free extreme pressure agent, a metal deactivator, an anti-wear agent, a pour point depressant, a detergent dispersant and a defoaming agent. The content of these additives may be 10% by mass or less, or 5% by mass or less, based on the total amount of the refrigerating machine oil, unless otherwise specified below.

Examples of the antioxidant include phenol-based antioxidants and amine-based antioxidants. Examples of the phenol-based antioxidant include 2,6-di-tert.-butyl-p-cresol (DBPC), 2,6-di-tert.-butyl-phenol, and 4,4'-methylenebis (2,6-di-tert.-butyl-phenol). Examples of the amine-based antioxidant include phenyl-α-naphthylamines and dialkylated diphenylamines. These antioxidants may be used alone or in combination of two or more thereof. The content of the antioxidant is, for example, 0.01 to 5% by mass, preferably 0.1 to 3% by mass, based on the total amount of the refrigerating machine oil.

Examples of the acid scavenger include an epoxy compound (epoxy-based acid scavenger). Examples of the epoxy compound include glycidyl ether type epoxy compounds, glycidyl ester type epoxy compounds, aryloxirane compounds, alkyloxirane compounds, alicyclic epoxy compounds, epoxidized fatty acid monoesters, and epoxidized vegetable oils. These acid scavengers may be used alone or in combination of two or more thereof. The content of the acid scavenger is, for example, 0.01 to 5% by mass and preferably 0.1 to 3% by mass, based on the total amount of the refrigerating machine oil.

The kinematic viscosity at 40° C. of the refrigerating machine oil is preferably 6 mm²/s or less, more preferably 5 mm²/s or less, and still more preferably 4 mm²/s or less. The lower limit of the kinematic viscosity at 40° C. of the refrigerating machine oil is not particularly limited, and may be, for example, 1 mm²/s or more or 2 mm²/s or more. The kinematic viscosity at 100° C. of the refrigerating machine oil may be preferably 0.5 mm²/s or more, more preferably 0.8 mm²/s or more, and still more preferably 1 mm²/s or more. The kinematic viscosity at 100° C. of the refrigerating machine oil may be preferably 10 mm²/s or less, more preferably 5 mm²/s or less, still more preferably 3 mm²/s or less, and particularly preferably 2 mm²/s or less.

The viscosity index of the refrigerating machine oil may be −50 or more, preferably 0 or more, more preferably 50 or more, and may be 200 or less.

The pour point of the refrigerating machine oil may be preferably −10° C. or lower, more preferably −20° C. or lower. The pour point in the present specification mean a pour point measured in accordance with JIS K2269:1987.

The volume resistivity of the refrigerating machine oil may be preferably $1.0 \times 10^9$ Ω·m or more, more preferably $1.0 \times 10^{10}$ Ω·m or more, and still more preferably $1.0 \times 10^{11}$ Ω·m or more. The volume resistivity in the present specification mean a volume resistivity at 25° C. measured in accordance with JIS C2101:1999.

The moisture content of the refrigerating machine oil may be preferably 200 ppm or less, more preferably 100 ppm or less, and still more preferably 50 ppm or less, based on the total amount of the refrigerating machine oil. The moisture content in the present specification means a moisture content measured in accordance with JIS K2275-2 or 3 (Karl Fischer volumetric titration method or coulometric titration method).

The acid value of the refrigerating machine oil may be preferably 1.0 mgKOH/g or less, more preferably 0.1 mgKOH/g or less. The hydroxyl value of the refrigerating machine oil is, for example, 10 mgKOH/g or less, preferably 5 mgKOH/g or less, and more preferably 2 mgKOH/g or less. The acid value in the present specification means an acid value measured in accordance with JIS K2501:2003. The hydroxyl value in the present specification means a hydroxyl value measured in accordance with JIS K0070:1992.

The ash content of the refrigerating machine oil may be preferably 100 ppm or less, and more preferably 50 ppm or less. The ash content in the present specification means an ash content measured in accordance with JIS K2272:1998.

The method for producing a refrigerating machine oil according to the present embodiment includes a step of mixing the first hydrocarbon base oil and the second hydrocarbon base oil such that the (A)/(B) ratio is more than 1 and 1.5 or less. The phosphorus-containing additive, polymer additive, and other additives contained in the refrigerating machine oil may be added to one or both of the first hydrocarbon base oil and the second hydrocarbon base oil before the step, may be added to the mixed base oil after the step, or may be added to the first hydrocarbon base oil and the second hydrocarbon base oil simultaneously with the step.

The refrigerating machine oil according to the present embodiment is usually mixed with a refrigerant present in a state of a working fluid composition for a refrigerating machine oil in a refrigerating machine containing a refrigerant circulation system containing a compressor, a condenser, an expansion mechanism, and an evaporator, and lubricates, for example, a sliding member in the compressor. That is, another embodiment of the present invention is a working fluid composition for a refrigerating machine oil containing the refrigerating machine oil and a refrigerant. The content of the refrigerating machine oil in the working fluid composition for a refrigerating machine oil may be 1 to 500 parts by mass or 2 to 400 parts by mass, with respect to 100 parts by mass of the refrigerant.

Examples of the refrigerant include hydrocarbon refrigerants, saturated hydrofluorocarbon refrigerants, unsaturated hydrofluorocarbon refrigerants, fluorine-containing ether-based refrigerants such as perfluoroethers, bis (trifluoromethyl) sulfide refrigerants, trifluoroiodomethane refrigerants, and natural refrigerants such as ammonia and carbon dioxide. In particular, the refrigerating machine oil according to the present embodiment is preferably used together with a hydrocarbon refrigerant. In other words, the working fluid composition for a refrigerating machine oil preferably contains a refrigerating machine oil and a hydrocarbon refrigerant.

The hydrocarbon refrigerant is preferably a hydrocarbon having 1 to 5 carbon atoms, and more preferably a hydrocarbon having 2 to 4 carbon atoms. Specific examples of the hydrocarbon include methane, ethylene, ethane, propylene, propane (R290), cyclopropane, n-butane, isobutane (R600a), cyclobutane, methylcyclopropane, 2-methylbutane, n-pentane, and a mixture of two or more thereof. Among these, the hydrocarbon refrigerant is preferably a hydrocarbon refrigerant that is gaseous at 25° C. and 1 atm, and more preferably propane, normal butane, isobutane, 2-methylbutane, or a mixture thereof.

The saturated hydrofluorocarbon refrigerant is a saturated hydrofluorocarbon having preferably 1 to 3 carbon atoms, more preferably 1 to 2 carbon atoms. Specific examples of the saturated hydrofluorocarbon refrigerant include difluoromethane (R32), trifluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245 fa), and 1,1,1,3,3-pentafluorobutane (R365mfc), or a mixture of two or more thereof.

The saturated hydrofluorocarbon refrigerant is appropriately selected from the above depending on the application and the required performance. Examples of the saturated hydrofluorocarbon refrigerant include R32 alone; R23 alone; R134a alone; R125 alone; a mixture of R134a/R32 of 60 to 80% by mass/40 to 20% by mass; a mixture of R32/R125 of 40 to 70% by mass/60 to 30% by mass; a mixture of R125/R143a of 40 to 60% by mass/60 to 40% by mass; a mixture of R134a/R32/R125 of 60% by mass/30% by mass/10% by mass; a mixture of R134a/R32/R125 of 40 to 70% by mass/15 to 35% by mass/5 to 40% by mass; and a mixture of R125/R134a/R143a of 35 to 55% by mass/1 to 15% by mass/40 to 60% by mass. More specific examples of the saturated hydrofluorocarbon refrigerant include a mixture of R134a/R32 of 70/30% by mass; a mixture of R32/R125 of 60/40% by mass; a mixture of R32/R125 of 50/50% by mass (R410A); a mixture of R32/R125 of 45/55% by mass (R410B); a mixture of R125/R143a of 50/50% by mass (R507C); a mixture of R32/R125/R134a of 30/10/60% by mass; a mixture of R32/R125/R134a of 23/25/52% by mass (R407C); a mixture of R32/R125/R134a of 25/15/60% by mass (R407E); and a mixture of R125/R134a/R143a of 44/4/52% by mass (R404A).

The unsaturated hydrofluorocarbon (HFO) refrigerant is preferably an unsaturated hydrofluorocarbon having 2 to 3 carbon atoms, more preferably a fluoropropene, and still more preferably a fluoropropene having 3 to 5 fluorine atoms. The unsaturated hydrofluorocarbon refrigerant is preferably any one or a mixture of two or more of 1,2,3,3,3-pentafluoropropene (HFO-1225ye), 1333-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf). The unsaturated hydrofluorocarbon refrigerant is preferably one or two or more selected from HFO-1225ye, HFO-1234ze and HFO-1234yf from the viewpoint of refrigerant physical properties. The unsaturated hydrofluorocarbon refrigerant may be fluoroethylene, and is preferably 1,1,2,3-trifluoroethylene.

EXAMPLES

Hereinafter, the present invention will be described in more detail based on examples, but the present invention is not limited to the following examples.

(Lubricating Base Oil)

Base oils 1 to 5 shown below were prepared, and the respective base oils were mixed so as to have compositions (parts by mass) shown in Table 1, thereby obtaining mixed base oils a to g.

Base oil 1: mineral oil (kinematic viscosity at 40° C.: 3.4 mm$^2$/s)

Base oil 2: mineral oil (kinematic viscosity at 40° C.: 2.4 mm$^2$/s)

Base oil 3: mineral oil (kinematic viscosity at 40° C.: 8.0 mm$^2$/s)

Base oil 4: mineral oil (kinematic viscosity at 40° C.: 100 mm$^2$/s)

Base oil 5: ethylene-α-olefin copolymer (kinematic viscosity at 40° C.: 384 mm$^2$/s)

The base oil 1 and the base oil 2 correspond to the first hydrocarbon base oil described above, and the base oil 3, the base oil 4 and the base oil 5 correspond to the second hydrocarbon base oil described above.

The kinematic viscosity at 40° C. of the obtained mixed base oil (A) [mm$^2$/s], the kinematic viscosity at 40° C. of the first hydrocarbon base oil (a mixture obtained by mixing the base oil 1 and the base oil 2 at a ratio shown in Table 1) (B) [mm$^2$/s], and the value of (A)/(B) ratio are shown in Table 1 below.

TABLE 1

| | | Mixed base oil | | | | | | |
|---|---|---|---|---|---|---|---|---|
| | | a | b | c | d | e | f | g |
| First hydrocarbon base oil | Base oil 1 | 38 | 50 | 57 | 57 | 50 | 100 | 45 |
| | Base oil 2 | 40 | 43 | 40 | 40 | 43 | — | 40 |
| Second hydrocarbon base oil | Base oil 3 | 22 | — | — | — | — | — | — |
| | Base oil 4 | — | 7 | — | 3 | — | — | — |
| | Base oil 5 | — | — | 3 | — | 7 | — | 15 |
| Properties regarding kinematic viscosity | (A) | 3.34 | 3.35 | 3.35 | 3.24 | 3.73 | 3.35 | 4.35 |
| | (B) | 2.74 | 2.80 | 2.85 | 2.85 | 2.80 | 3.35 | 2.80 |
| | (A)/(B) | 1.22 | 1.20 | 1.18 | 1.14 | 1.33 | 1.00 | 1.55 |

(Refrigerating Machine Oil)

In Examples and Comparative Examples, the lubricating base oil (mixed base oil) and the following additives were used to prepare a refrigerating machine oil having a composition (% by mass based on the total amount of the refrigerating machine oil) shown in Tables 2 to 4. Common to these refrigerating machine oils, a silicone-based defoaming agent 5 ppm was added.

Phosphorus-containing additives: tricresyl phosphate and triphenyl phosphorothionate (both having a purity of 98% or more)

Polymer additive: copolymer of maleic acid ester and α-olefin (kinematic viscosity at 40° C.: 1980 mm$^2$/s, kinematic viscosity at 100° C.: 200 mm²/s, viscosity index: 227, Mn of copolymer: 4500, Mw/Mn: 2.2, residual carbon content: 3.1% by mass)

(Evaluation of friction characteristics)

In order to evaluate the friction characteristics of each of the refrigerating machine oils of Examples and Comparative Examples, the following tests were performed.

Using an MTM (Mini Traction Machine) tester (manufactured by PCS Instruments), the friction coefficient (μ) in each lubrication region was measured under the following conditions. The results are shown in Table 2 to Table 4. The smaller the friction coefficient is, the more excellent the friction characteristics are.

Ball and disc: standard test piece (AISI52100 standard)
Test temperature: 40° C.
Sliding speed: 0.0006 to 0.9 m/s (partially extracted)
Load: 10N
Slip ratio: 30%

The value of $|U_D-U_B|$ [m/s] was used as the sliding speed, wherein $U_D$ is the speed [m/s] of the disk in the sliding part and Us is the speed [m/s] of the ball in the sliding part.

TABLE 2

| | | Example 1 | Example 2 | Example 3 | Example 4 |
|---|---|---|---|---|---|
| Type of mixed base oil | | a | b | c | a |
| Composition (% by mass) | Mixed base oil | Balance | Balance | Balance | Balance |
| | Phosphorus-containing additive | 1.7 | 1.7 | 1.7 | 1.7 |
| | Polymer additive | — | — | — | 1.0 |
| Kinematic viscosity at 40° C. (mm²/s) | | 3.4 | 3.4 | 3.4 | 3.5 |
| Friction coefficient (μ) | Sliding speed (m/s) | | | | |
| | 0.9 | 0.019 | 0.016 | 0.015 | 0.018 |
| | 0.6 | 0.020 | 0.016 | 0.015 | 0.017 |
| | 0.3 | 0.022 | 0.018 | 0.017 | 0.018 |
| | 0.24 | 0.023 | 0.019 | 0.019 | 0.020 |
| | 0.15 | 0.027 | 0.023 | 0.024 | 0.024 |

TABLE 3

| | | Example 5 | Example 6 | Example 7 | Example 8 | Example 9 |
|---|---|---|---|---|---|---|
| Type of mixed base oil | | b | b | b | d | e |
| Composition (% by mass) | Mixed base oil | Balance | Balance | Balance | Balance | Balance |
| | Phosphorus-containing additive | 1.7 | 1.7 | 1.7 | 1.7 | 1.7 |
| | Polymer additive | 0.5 | 1.0 | 3.0 | — | — |
| Kinematic viscosity at 40° C. (mm²/s) | | 3.4 | 3.5 | 3.6 | 3.3 | 3.8 |
| | Sliding speed (m/s) | | | | | |
| Friction coefficient (μ) | 0.9 | 0.017 | 0.016 | 0.018 | 0.015 | 0.021 |
| | 0.6 | 0.017 | 0.016 | 0.018 | 0.015 | 0.021 |
| | 0.3 | 0.018 | 0.017 | 0.020 | 0.016 | 0.026 |
| | 0.24 | 0.018 | 0.018 | 0.021 | 0.018 | 0.029 |
| | 0.15 | 0.022 | 0.020 | 0.024 | 0.021 | 0.036 |

TABLE 4

| | | Comp. Example 1 | Comp. Example 2 |
|---|---|---|---|
| Type of mixed base oil | | f | g |
| Composition (% by mass) | Mixed base oil | Balance | Balance |
| | Phosphorus-containing additive | 1.7 | 1.7 |
| | Polymer additive | — | — |
| Kinematic viscosity at 40° C. (mm²/s) | | 3.4 | 4.4 |
| Friction coefficient (μ) | Sliding speed (m/s) | | |
| | 0.9 | 0.025 | 0.028 |
| | 0.6 | 0.025 | 0.028 |
| | 0.3 | 0.029 | 0.031 |
| | 0.24 | 0.031 | 0.032 |
| | 0.15 | 0.037 | 0.037 |

The invention claimed is:

1. A refrigerating machine oil comprising a mixed base oil of
a first hydrocarbon base oil having a kinematic viscosity at 40° C. of 1.5 mm²/s or more and 3.4 mm²/s or less, and comprising a mineral oil, and
a second hydrocarbon base oil having a kinematic viscosity at 40° C. of 8 mm²/s or more and 384 mm²/s or less, and comprising at least one selected from the group consisting of a mineral oil and an ethylene-α-olefin copolymer,
wherein a total content of the first hydrocarbon base oil and the second hydrocarbon base oil is 90% by mass or more based on the total amount of the refrigerating machine oil,
wherein a content of the first hydrocarbon base oil is 70% by mass or more and 99.5% by mass or less, and a content of the second hydrocarbon base oil is 0.5% by mass or more and 30% by mass or less, based on the total amount of the first hydrocarbon base oil and the second hydrocarbon base oil,
wherein a (A)/(B) ratio is more than 1.1 and 1.25 or less, wherein (A) is a kinematic viscosity at 40° C. of the mixed base oil, and (B) is the kinematic viscosity at 40° C. of the first hydrocarbon base oil, and
wherein the refrigerating machine oil further comprises a phosphorus-containing additive selected from the group consisting of triphenyl phosphate, tricresyl phosphate, and triphenyl phosphorothionate, wherein a total content of the first hydrocarbon base oil and the second hydrocarbon base oil is 90% by mass or more, and a content of the phosphorus-containing additive is 1% by mass or more and 3% by mass or less, based on the total amount of the refrigerating machine oil, and wherein the refrigerating machine oil is used with a refrigerant.

2. The refrigerating machine oil according to claim 1, wherein the kinematic viscosity at 40° C. of the second hydrocarbon base oil is 20 mm$^2$/s or more and 384 mm$^2$/s or less.

3. The refrigerating machine oil according to claim 1, further comprising a polymer additive.

4. The refrigerating machine oil according to claim 3, wherein a content of the polymer additive is 5% by mass or less based on a total amount of the refrigerating machine oil.

5. The refrigerating machine oil according to claim 1, having a kinematic viscosity at 40° C. of 6 mm$^2$/s or less.

6. The refrigerating machine oil according to claim 1, being used together with a hydrocarbon refrigerant.

7. A working fluid composition for a refrigerating machine oil comprising:

the refrigerating machine oil according to claim 1; and a refrigerant.

8. The working fluid composition for a refrigerating machine oil of claim 7, wherein the refrigerant comprises a hydrocarbon refrigerant.

9. A method for producing a refrigerating machine oil comprising a mixed base oil of p1 a first hydrocarbon base oil having a kinematic viscosity at 40° C. of 1.5 mm$^2$/s or more and 3.4 mm$^2$/s or less, and comprising a mineral oil, and a second hydrocarbon base oil having a kinematic viscosity at 40° C. of 8 mm$^2$/s or more and 384 mm$^2$/s or less, and comprising at least one selected from the group consisting of a mineral oil and an ethylene-α-olefin copolymer, wherein a total content of the first hydrocarbon base oil and the second hydrocarbon base oil is 90% by mass or more based on the total amount of the refrigerating machine oil, wherein a content of the first hydrocarbon base oil is 70% by mass or more and 99.5% by mass or less, and a content of the second hydrocarbon base oil is 0.5% by mass or more and 30% by mass or less, based on the total amount of the first hydrocarbon base oil and the second hydrocarbon base oil, and wherein the refrigerating machine oil further comprises a phosphorus-containing additive selected from the group consisting of triphenyl phosphate, tricresyl phosphate, and triphenyl phosphorothionate, wherein a total content of the first hydrocarbon base oil and the second hydrocarbon base oil is 90% by mass or more, and a content of the phosphorus-containing additive is 1% by mass or more and 3% by mass or less, based on the total amount of the refrigerating machine oil, and wherein the refrigerating machine oil is used with a refrigerant;

the method comprising:

mixing the first hydrocarbon base oil and the second hydrocarbon base oil such that a (A)/(B) ratio is more than 1.1 and 1.25 or less, wherein (A) is a kinematic viscosity at 40°° C. of the mixed base oil, and (B) is the kinematic viscosity at 40° C. of the first hydrocarbon base oil.

* * * * *

UNITED STATES PATENT AND TRADEMARK OFFICE
CERTIFICATE OF CORRECTION

PATENT NO. : 12,098,346 B2  
APPLICATION NO. : 17/920114  
DATED : September 24, 2024  
INVENTOR(S) : F. Nara et al.

Page 1 of 1

It is certified that error appears in the above-identified patent and that said Letters Patent is hereby corrected as shown below:

In the Claims

Column 15, Line 32 (Claim 9, Line 2), please change "of p1" to --of--

Column 16, Line 32 (Claim 9, Line 37), please change "40°°" to --40°--

Signed and Sealed this  
Eighteenth Day of February, 2025

Coke Morgan Stewart  
*Acting Director of the United States Patent and Trademark Office*